(12) United States Patent
Kwon et al.

(10) Patent No.: US 8,930,120 B2
(45) Date of Patent: Jan. 6, 2015

(54) SYSTEM FOR FAULT DETECTION AND DIAGNOSIS OF AIRCRAFT ENGINE AND METHOD THEREOF

(75) Inventors: Oh-Kyu Kwon, Incheon (KR); Ji-Hyuk Yang, Incheon (KR); Sang Yong Lee, Incheon (KR)

(73) Assignee: Inha-Industry Partnership Institute, Incheon (KR)

( * ) Notice: Subject to any disclaimer, the term of this patent is extended or adjusted under 35 U.S.C. 154(b) by 169 days.

(21) Appl. No.: 13/704,053

(22) PCT Filed: Jun. 14, 2011

(86) PCT No.: PCT/KR2011/004349
§ 371 (c)(1),
(2), (4) Date: Dec. 13, 2012

(87) PCT Pub. No.: WO2011/159088
PCT Pub. Date: Dec. 22, 2011

(65) Prior Publication Data
US 2013/0090831 A1 Apr. 11, 2013

(30) Foreign Application Priority Data

Jun. 14, 2010 (KR) ........................ 10-2010-0056120

(51) Int. Cl.
*G06F 17/00* (2006.01)
*G06F 19/00* (2011.01)
*G01M 15/12* (2006.01)
*G01M 15/14* (2006.01)
*G01H 17/00* (2006.01)

(52) U.S. Cl.
CPC ............... *G01M 15/14* (2013.01); *G01H 17/00* (2013.01); *G01M 15/12* (2013.01)
USPC ........ 701/111; 701/29.1; 701/30.2; 701/30.9; 701/31.1; 340/945; 340/963

(58) Field of Classification Search
USPC ............... 701/1, 3, 8, 9, 14, 36, 99, 100, 101, 701/110, 111, 29.1, 29.7, 29.9, 30.2, 30.3, 701/30.4, 30.5, 30.8, 30.9, 31.1, 31.7, 31.8, 701/31.9, 32.1, 32.9, 33.4; 340/945, 963, 340/971
See application file for complete search history.

(56) References Cited

U.S. PATENT DOCUMENTS 4,817,046 A    3/1989    Rice et al.
5,245,552 A *   9/1993    Andersson et al. ........... 700/280

(Continued)

FOREIGN PATENT DOCUMENTS

KR    10-1987-0010298 A    11/1987
KR    10-0582584 B1    5/2006
KR    10-0722832 B1    5/2007

OTHER PUBLICATIONS

International Search Report dated Dec. 26, 2011, as issued in corresponding International Application No. PCT/KR2011/004349, filed Jun. 14, 2011.

*Primary Examiner* — Thomas Tarcza
*Assistant Examiner* — Edward Pipala
(74) *Attorney, Agent, or Firm* — Maier & Maier, PLLC

(57) ABSTRACT

A system for detecting and diagnosing a faultive state of an airplane engine, including: at least one vibration sensor attached to an airplane; a reference model database construction unit; and a fault detection and diagnosis unit which estimates a parameter of a model, obtains a test variable and a numerator coefficient value difference of a transfer function between the models, and the covariance of parameter estimation error, and diagnoses the faultive state and the faultive cause of the airplane engine. Accordingly, the present invention can determine the faultive state and the detective cause of the airplane engine using the vibration data of the airplane engine.

14 Claims, 11 Drawing Sheets

(56) References Cited

U.S. PATENT DOCUMENTS

| | | | |
|---|---|---|---|
| 7,363,111 B2* | 4/2008 | Vian et al. | 700/279 |
| 7,400,943 B2* | 7/2008 | Vian et al. | 700/279 |
| 2004/0060347 A1* | 4/2004 | Comperat et al. | 73/66 |
| 2005/0119840 A1* | 6/2005 | Astley et al. | 702/56 |
| 2007/0272013 A1* | 11/2007 | Vian et al. | 73/460 |
| 2008/0039993 A1* | 2/2008 | Cleary et al. | 701/29 |
| 2009/0082919 A1* | 3/2009 | Hershey et al. | 701/35 |
| 2010/0076693 A1* | 3/2010 | Liang et al. | 702/22 |

\* cited by examiner

SYSTEM FOR FAULT DETECTION AND DIAGNOSIS OF AIRCRAFT ENGINE AND METHOD THEREOF

RELATED APPLICATIONS

This is the U.S. national stage application which claims priority under 35 U.S.C. §371 to International Patent Application No.: PCT/KR2011/004349 filed on Jun. 14, 2011, which claims priority to Korean Patent Application No. 10-2010-0056120 filed on Jun. 14, 2010, in the Korean Intellectual Property Office, the disclosures of which are incorporated by reference herein their entireties.

BACKGROUND OF THE INVENTION

1. Field of the Invention

The present invention relates to a system for detection and diagnosis of a fault in an airplane engine and a method thereof, and more particularly, to a system for detecting fault of an airplane engine by extracting appropriate output data corresponding to virtual input data using nonfaulty vibration data from a vibration sensor, obtains a covariance of parameter estimation errors from reference nonfaulty model parameters between input/output based on the virtual input data and the extracted output data, and statistical properties, estimates suspicious model parameters using suspicious data from the vibration sensor, obtains a difference between test variable and numerator coefficient of a transfer function using the estimated suspicious model parameters and the reference nonfaulty model parameters, and diagnosing presence/absence of fault in the airplane engine and cause of the fault based on the difference between the test variable and the numerator coefficient, and a method thereof.

2. Description of the Related Art

The aerospace manufacturers and engine manufacturers have developed and implemented programs to maintain the engines. However, because the development and mass production of airplanes in South Korea were only possible relatively in recent days, most engine maintenance programs are based on the procedures and manuals provided from the engine manufacturers for the purpose of maintenance of engine itself.

Because the programs provided by the engine source manufacturers are limited to the repair of the engine, problems generated in the engine due to operation of the airplane integrated with the engine are not properly managed when occurred.

The engine is considered the most important component in terms of the safe flight of the airplane. A fault in the engine during flight oftentimes results in serious problem in the safe cruising of the flight, which in turns causes damages to not only the airplane itself, but also lives and others. Therefore, prevention of fault in an engine through proper maintenance of engine wholesomeness is of utmost importance.

Accordingly, a system is necessary, which is capable of finding a problem in advance and instructing maintenance procedure to maintain wholesomeness of the engine.

SUMMARY OF THE INVENTION

The present invention has been made to overcome the problems mentioned above, and accordingly, it is an object of the present invention to provide a system capable of determining and diagnosing presence/absence of fault in an airplane engine and a cause of the fault using vibration data of the engine, and a method thereof.

In order to achieve the objects mentioned above, a technical aspect of the present invention is to provide a system for detection and diagnosis of fault of an airplane engine, which may include one or more vibration sensors attached to the airplane, a reference model database construction device which generates virtual input data using nonfaulty vibration data from the vibration sensors and rotor speed of the airplane engine and extracts output data, estimates nonfaulty model parameters based on the input/output data set, obtains a covariance using another input/output data set different from the input/output data set, and constructs a reference model database, and a fault detection and diagnosis method which estimates suspicious model parameters using suspicious data from the vibration sensors, obtains test variables and a difference of numerator coefficients of transfer functions using the estimated parameters, the reference nonfaulty model parameters and the covariance of the parameter estimation errors, and determines presence/absence of fault of the airplane engine and the cause of the fault based on the test variables and the difference of the numerator coefficients.

Another technical aspect of the present invention is to provide a generation and extraction module which may generate virtual input data in a sine wave pattern, having appropriate sampling time and data size suitable for system identification, that is, to reflect characteristics of engine necessary for diagnosis and detection of fault, and also having a cycle corresponding to a rotor speed of an airplane engine, and appropriate phase and amplitude, select an appropriate constant velocity section having few changes in vibration cycle from the vibration data received from one or more vibration sensors attached to the airplane, and extract output data corresponding to the virtual input data.

Another technical aspect of the present invention is to provide a reference model database construction device which may include a generation and extraction module which generates virtual input data using nonfaulty vibration data from one or more vibration sensors attached to an airplane and rotor speed of an airplane engine and extracts output data, a reference model parameter estimation module which estimates reference model parameters by applying least squares method to the input/output data set, and a covariance calculation module which obtains a covariance of parameter estimation errors using the input/output data set, another input/output data set selected from different section of nonfaulty vibration data, statistical property corresponding to variance of sensor noise from the vibration sensors, and statistical property of unmodeled transfer functions.

Generally, in order to obtain covariance, a plurality of nonfaulty vibration data sets, rather than one nonfaulty data set, are used. However, based on hypothesis that the vibration data satisfies ergodic statistical properties, different sections of one nonfault data set may be used. The hypothesis is generally effective in the vibration data of the airplane.

The reference model database construction device additionally includes a storage module which stores the reference nonfaulty model parameters and the covariance of the parameter estimation errors.

The generation and extraction module generates virtual input data in sine wave pattern having a cycle corresponding to the rotor speed of the engine, and also having appropriate amplitude, phase, sampling time and data size, and extracts corresponding output data, in which the extracted output data corresponds to the phase set with reference to zero-crossing point of the vibration data to match the phase.

Further, according to the present invention, fault detection and diagnosis method is provided, which may include a generation and extraction module which generates virtual input data using suspicious vibration data received from one or more vibration sensors attached to an airplane and rotor speed of an engine of the airplane and extracts output data, a parameter estimation module which estimates suspicious model parameters by applying least squares method to a predetermined section using the input/output data set, a calculation module which obtains test variables and a difference of numerator coefficients by using the input/output data set, previously stored reference nonfaulty model parameters, and a covariance of parameter estimation errors, and a fault detection and diagnosis module which detects a presence/absence of fault of the airplane engine based on the obtained test variables and the difference of numerator coefficients, and diagnoses a cause of the fault.

The fault detection and diagnosis method may additionally include a diagnosis result notifying module which informs a user of a diagnosis result of the fault detection and diagnosis module.

The fault detection and diagnosis method may estimate parameters using:

$$\hat{\theta}_N^{LS} = \underset{\theta}{\operatorname{argmin}} V_N(\theta, Z^N) = R^{-1}(N) f(N),$$

where $$V_N(\theta, Z^N) = \frac{1}{N} \sum_{k=1}^{N} \frac{1}{2} (y(k) - \phi^T(k)\theta)^2,$$

$$R(N) = \frac{1}{N} \sum_{k=1}^{N} \frac{1}{2} \phi(k)\phi^T(k),$$

$$f(N) = \frac{1}{N} \sum_{k=1}^{N} \frac{1}{2} \phi(k)y(k), y(k)$$

are output data, respectively.

The calculation module obtains the test variables using the covariance stored at the storage module of the reference model database construction device.

The test variables ($T_1$) may be obtained by:

$$T_1 = [\hat{\theta}_n - \hat{\theta}_f]^T C^{-1} [\hat{\theta}_n - \hat{\theta}_f]$$

where $\hat{\theta}_n$ denotes reference model parameters, $\hat{\theta}_f$ denotes parameters estimated from suspicious model, C denotes covariance of parameter estimation errors, which are obtained at the reference model database construction device to reflect uncertainty generated due to noise, undermodeling error, and nonlinearity under nonfaulty condition.

The calculation module obtains a difference of numerator coefficients between transfer function of the reference nonfaulty model and transfer function of the suspicious model, in which denominator of the suspicious model transfer function is fixed as denominator of the reference nonfaulty model transfer function.

The fault detection and diagnosis module determines that a fault is generated in the airplane engine, if the test variables are equal to or greater than a predetermined threshold.

Further, the fault detection and diagnosis module diagnoses a cause of fault corresponding to the obtained difference of numerator coefficients, using causes of faults matched with differences of numerator coefficients stored in advance.

Another technical aspect of the present invention is to provide a method for constructing reference model database, the method comprising steps of: (a) generating virtual input data using nonfaulty vibration data from one or more vibration sensors attached to an airplane and rotor speed of an airplane engine and extracting output data, (b) estimating reference model parameters by applying least squares method to the input/output data set, (c) obtaining a covariance of parameter estimation errors using the input/output data set, another input/output data set selected from different section of nonfaulty vibration data, statistical property corresponding to variance of sensor noise from the vibration sensors, and statistical property of unmodeled transfer functions, and (d) and constructing the reference model database by storing the estimated reference model parameters and the covariance of the parameter estimation errors.

The step (a) may include steps of receiving nonfaulty vibration data of the airplane engine from the one or more vibration sensors and determining vibration data corresponding to when the rotor speed is in constant velocity section and the rotor speed at that time, generating virtual input data in a sine wave pattern having appropriate sampling time and data size, using a cycle corresponding to a cycle of the determined rotor speed and appropriate phase and amplitude, selecting, from the received vibration data, a reference starting point of data extraction based on zero-crossing by selecting appropriate constant velocity section of the vibration data for use in the parameter estimation, and extracting, from the selected reference point, output data corresponding to the generated virtual input since the selected reference starting point of the vibration data.

Another technical aspect of the present invention is to provide a method for detection and diagnosis of fault of an airplane engine, the method comprising steps of: (a) receiving suspicious vibration data of the airplane engine from the one or more vibration sensors and determining vibration data corresponding to when the rotor speed is in constant velocity section and the rotor speed at that time, (b) estimating suspicious model parameters by implementing least square methods to the obtained input/output data set, (c) obtaining test variables and a difference of numerator coefficients of transfer functions, using the estimated parameters, previously stored reference nonfaulty model parameters and a covariance of parameter estimation errors, and (d) detecting a presence/absence of a fault in the airplane engine based on the obtained test variables and the difference of the numerator coefficients and diagnosing a cause of the fault.

Prior to the step (a), the method may additionally include steps of, if the rotor speed of the airplane engine is in constant velocity section, generating virtual input data using nonfaulty vibration data from the vibration sensors and the rotor speed of the airplane engine, obtaining reference nonfaulty model parameters based on the input/output data set, and constructing a reference model database by obtaining a covariance of the parameter estimation errors which reflects a degree of uncertainty using the input/output data set, another input/output data set selected from another nonfaulty section of the vibration data, and statistical property.

After the step (d), the method may additionally include a step of notifying a user of a result of diagnosing presence/absence of fault.

The step (c) may include obtaining test variables using parameters of the reference model database, the covariance, and parameters estimated from the suspicious data, and obtains a difference of numerator coefficients between transfer function of the reference model database model and transfer function of the model estimated from the suspicious data.

The step (d) may include determining that a fault is generated in the airplane engine, if the test variables as obtained are equal to or greater than a predetermined threshold, and diagnosing a cause of the fault that corresponds to the difference of the numerator coefficients, using previously stored causes of faults matched with the respective differences of the numerator coefficients.

In various embodiments, it is possible to determine presence/absence of a fault in an airplane engine and cause of the fault, using vibration data thereof.

Further, early detection and prognosis of fault is enabled, because fault of an airplane is detected and diagnosed with increased accuracy and the cause of the fault of the airplane is detected and diagnosed in real-time basis.

BRIEF DESCRIPTION OF THE DRAWINGS

The foregoing and/or other aspects of the present invention will be more apparent upon reading the description of certain exemplary embodiments with reference to the accompanying drawings, in which.

EXPLANATION OF REFERENCE NUMERALS

Figure 1:
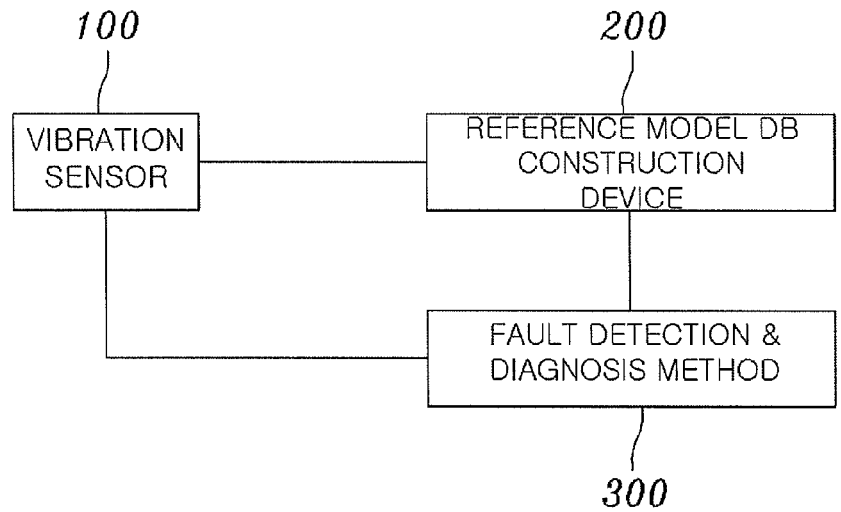
FIG. 1 is a block diagram of a system for detecting and diagnosing a fault of an airplane engine according to the present invention.

100: vibration sensor
200: Reference model database constructing device
210: generation and extraction module for generating virtual input data and extracting output data
220: reference model parameter estimation module
230: covariance calculation module
240: storage module
300: fault detection and diagnosis method
310: generation and extraction module for generating virtual input data and extracting output data
320: parameter estimation module
330: calculation module
340: fault detection and diagnosis module
350: diagnosis result notification module

DETAILED DESCRIPTION OF THE INVENTION

The objects, technical constitutions and effects of the present invention will now be explained in greater detail below with reference to the accompanying drawings and the embodiments.

FIG. 1 is a block diagram of a system for detecting and diagnosing a fault in an airplane engine according to the present invention.

Referring to FIG. 1, the system for detecting and diagnosing fault in an airplane engine according to the present invention includes one or more vibration sensors 100 attached to the airplane, a reference model database construction device 200 which constructs reference model database using the vibration data from the vibration sensor 100, and a fault detection and diagnosis method 300 which detects and diagnoses fault in the airplane using the vibration data suspected of fault ('suspicious/suspected data') and the reference model database.

The one or more vibration sensors 100 are provided on a predetermined area of an airplane flange.

The reference model database construction device 200 generates virtual input data using rotor speed information of the airplane engine provided from a basic system of the airplane and the nonfaulty vibration data received from the vibration sensor 100, extracts output data corresponding to the generated virtual input data, and constructs a reference model database by obtaining the reference model parameters and covariance of estimation error parameters based on the statistical properties of the virtual input data and the output data.

The reference model database construction device 200 will be explained below with reference to FIG. 2.

The fault detection and diagnosis method 300 estimates suspicious model parameters using the suspicious data from the vibration sensors 100, and obtains a test variable using the estimated parameters and the covariance of the estimation error parameters of the reference model database construction device 200.

Next, the fault detection and diagnosis method 300 obtains a difference of numerator coefficients of transfer functions between the nonfaulty reference model and the suspicious model, and diagnoses whether or not a fault is occurred in the airplane engine and cause of the fault using the test variables and the differences of the numerator coefficients.

The fault detection and diagnosis method 300 playing the role explained above will be explained below with reference to FIG. 3.

Figure 2:
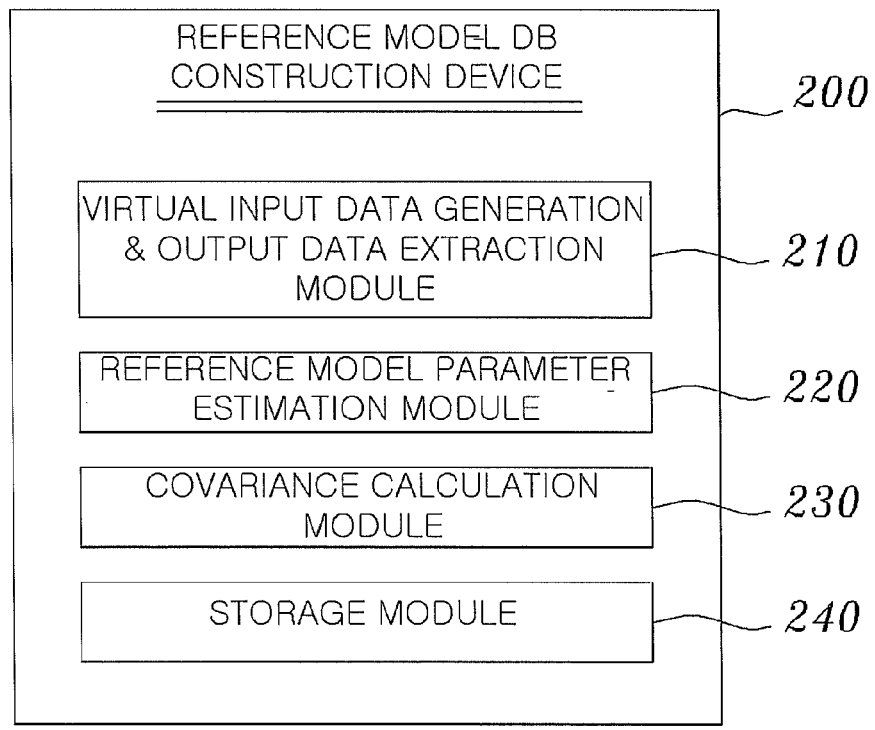
FIG. 2 is a schematic block diagram of a reference model database construction device according to the present invention.

FIG. 2 is a schematic block diagram of the reference model database construction device 200 according to the present invention.

Referring to FIG. 2, the reference model database construction device 200 includes a generation and extraction module 210 for generating virtual input data and extracting output data, a reference model parameter estimation module 220, a covariance calculation module 230 and a storage module 240.

The generation and extraction module 210 generates virtual input data using the rotor speed of the airplane engine and the nonfaulty vibration data received from one or more vibration sensors attached to the airplane and extracts corresponding vibration data.

That is, the generation and extraction module 210 receives the rotor speed of the engine from the airplane system, receives the vibration data from the vibration sensor until sufficient uniform velocity is ensured, determines sampling time suitable for identifying the system of the airplane engine and size of the entire data, generates virtual input data having cycle corresponding to the rotor speed of the engine and suitable amplitude and phase, selects starting time of data extraction via zero-crossing detection by selecting appropriate uniform velocity section of the vibration data, and then extracts output data corresponding to the virtual input data.

The reference model parameter estimation module 220 implements least squares method to estimate parameters of a reference nonfaulty model using the input/output data set obtained at the generation and extraction module.

The covariance calculation module 230 obtains covariance of estimation error parameters using the input/output data using another selected input/output data set different from the input/output data set used for the reference nonfaulty model parameters, and statistical properties.

The resultant covariance reflects uncertainty, noise, etc. in nonfaulty condition of the vibration data.

Herein, the output data of the two data sets are selected from the sections of the nonfaulty data, but the virtual input data may be equally used.

Calculation is simple when the virtual input data is equal.

This will be explained below with reference to Equation 13.

The storage module 240 builds up a reference model database based on the reference nonfaulty model parameters estimated at the reference model parameter estimation module 220 and the covariance of the estimation error parameters obtained from the covariance calculation module 230.

Figure 3:
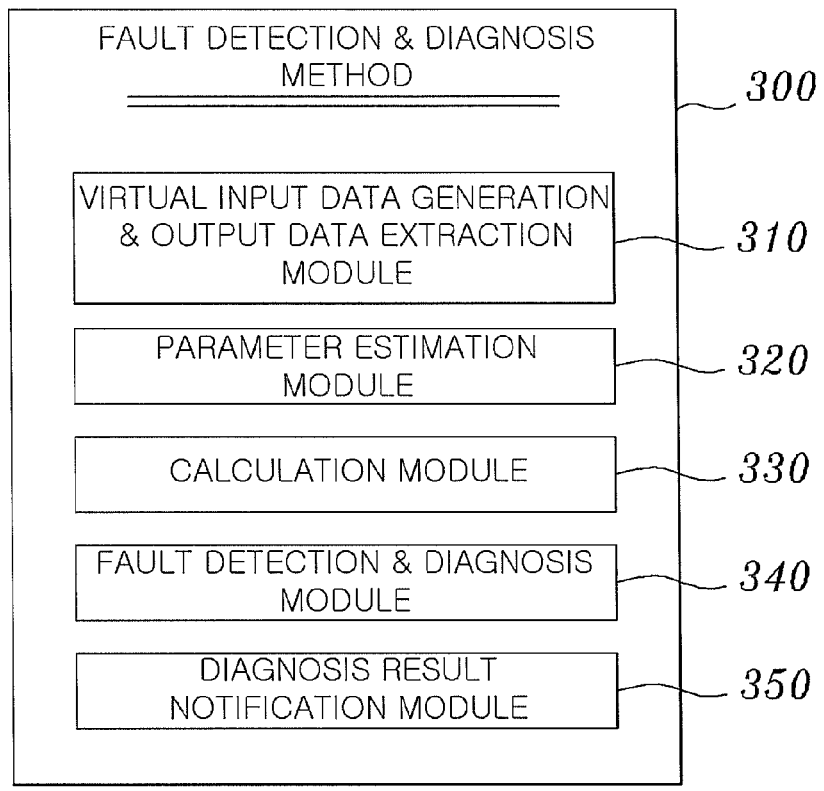
FIG. 3 is a schematic block diagram of a method for diagnosis and detection a fault according to the present invention.
Figure 4:
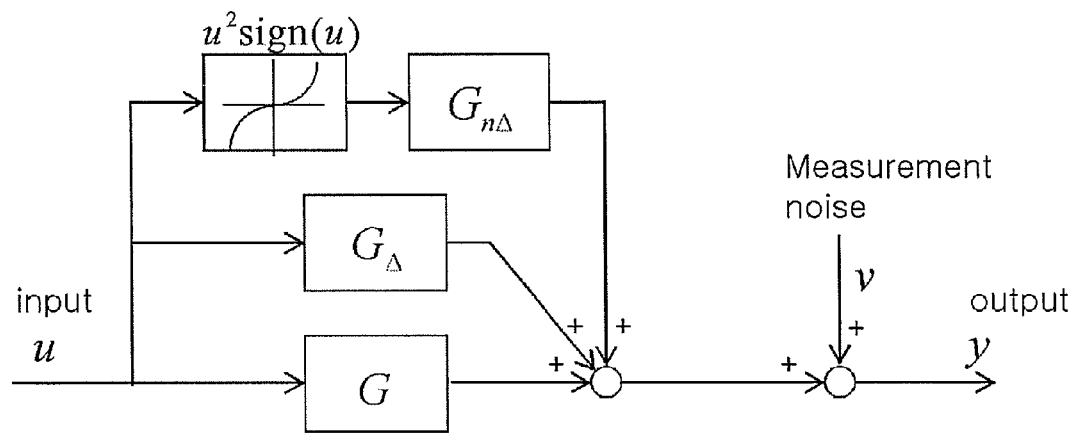
FIGS. 4 and 5 are views provided to explain a method for estimating parameters according to the present invention.
Figure 5:
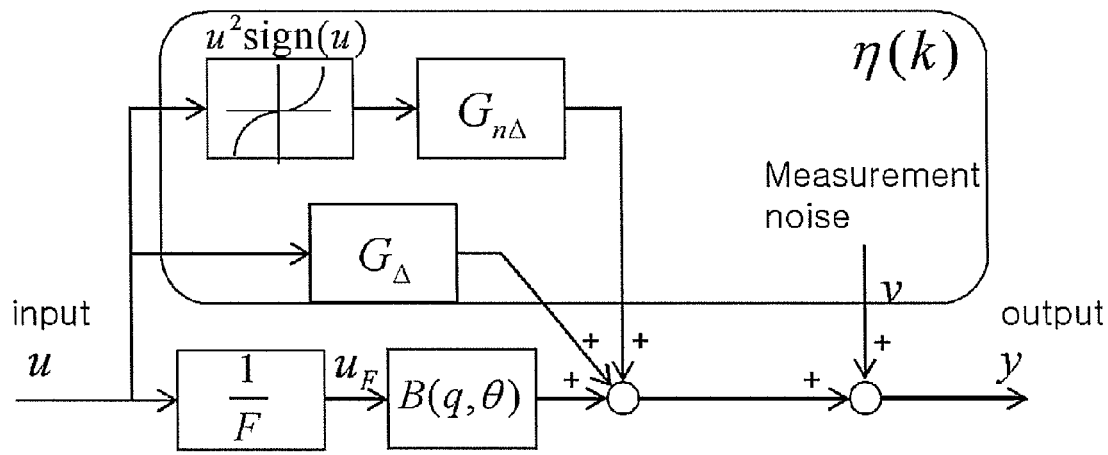

FIG. 3 is a schematic block diagram of a method for diagnosis and detection a fault according to the present invention, and FIGS. 4 and 5 are views provided to explain a method for estimating parameters according to the present invention.

Referring to FIG. 3, the fault detection and diagnosis method 300 includes a generation and extraction module 310 for generating virtual input data and extracting output data, a parameter estimation module 320, a calculation module 330, a fault detection and diagnosis module 340 and a diagnosis result notification module 350.

The generation and extraction module 310 constructs input/output data set using revolutions per minute (rpm) of the airplane engine and suspicious data received from one or more vibration sensors attached to the airplane.

In doing so, the generation and extraction module 310 may implement the same method as that used at the generation and extraction module 210 explained above.

The parameter estimation module 320 estimates parameters of the suspicious model by implementing the least squares method with respect to the input/output data set.

The denominator of the suspicious model transfer function is fixed as same as the denominator of the transfer function of the nonfaulty reference model before the parameter estimation.

The parameter estimation module 320 estimates parameters in the manner illustrated in FIGS. 4 and 5.

Referring to FIG. 4, a typical engine acceleration conversion response is represented by a system based on input (u)-output (y) relationship tailor series.

Accordingly, output (y) is expressed by:

$$y(k) = G(q^{-1})u(k) + G_\Delta(q^{-1})u(k) + G_{n\Delta}(q^{-1})u^2\text{sign}(u(k)) + v(k)$$ [Equation 1]

where, $q^{-1}$ denotes delay operator, G is model, $G_\Delta$ is mismatched model, $G_{n\Delta}$ is linearization error model, u(k) is input data, and v(k) is measurement noise. V refers to zero-mean white noise with variance, and the model (G) is expressed by:

$$G(q^{-1}, \theta) = \frac{B(q^{-1}, \theta, n_B)}{F(q^{-1}, n_F)}$$ [Equation 2]

$$= \frac{b_1 q^{-1} + b_2 q^{-2} + \ldots + b_{n_B} q^{-n_B}}{1 + f_1 q^{-1} + f_2 q^{-2} + \ldots + f_{n_F} q^{-n_F}}$$

where F may be the same as a value obtained at the reference model database construction device, and θ is parameter vector which may be expressed by:

$$\theta = [b_1 b_2 \ldots b_{n_B}]^T$$

where $n_B$ and $n_F$ of G, which is expressed by the stable casual discrete-time system, are the orders of the numerator and denominator of the model, respectively.

The essential concept of the present invention is to provide a method of estimating parameters of a model using denominator as a fixed value, based on hypothesis that an error generated due to the fixed divisor of the fixed denominator polynomial can be easily dealt with by adjusting the numerator polynomial.

FIG. 5 illustrates the parameter estimation module 320.

Referring to FIG. 5, the output may be expressed by:

$$y(k) = B(q^{-1}, \theta, n_B) u_F(k) + \eta(k)$$ [Equation 3]

where, $$u_F(k) = \frac{1}{F(q^{-1}, n_F)} u(k),$$

$$\eta(k) = G_\Delta(q^{-1}) u(k) + G_{n\Delta}(q^{-1}) u^2 \text{sign}(u(k)) + v(k)$$ [Equation 3]

Equation may be represented in standard linear regression form as:

$$y(k) = \phi^T(k)\theta + \eta(k)$$ [Equation 4]

where, φ(k) may be represented by:

$$\phi(k) = [u_F(k-1), u_F(k-2), \ldots, u_F(k-n_B)]^T$$ [Equation 5]

Accordingly, the parameter estimation module 320 estimates parameters using the ordinary least-squares method by:

$$\hat{\theta}_N^{LS} = \underset{\theta}{\operatorname{argmin}} V_N(\theta, Z^N) = R^{-1}(N) f(N)$$ [Equation 6]

where, $$V_N(\theta, Z^N) = \frac{1}{N} \sum_{k=1}^{N} \frac{1}{2} (y(k) - \phi^T(k)\theta)^2,$$

$$R(N) = \frac{1}{N} \sum_{k=1}^{N} \frac{1}{2} \phi(k) \phi^T(k),$$

$$f(N) = \frac{1}{N} \sum_{k=1}^{N} \frac{1}{2} \phi(k) y(k).$$

Referring to Equation 6, $V_N$ denotes an output error.

Accordingly, the meaning of Equation 6 is that it is desired to obtain a parameter to minimize output error, θ. Several methods may be implemented to this purpose.

According to the present invention, the parameter estimation module 320 utilizes the least squares method as Equation 7 to minimize Equation 6:

$$\hat{\theta} = [\Phi^T \Phi]^{-1} \Phi^T Y \qquad \text{[Equation 7]}$$

where, $$\Phi \stackrel{\Delta}{=} [\phi(1), \phi(2), \ldots, \phi(N)]^T,$$

$$Y \stackrel{\Delta}{=} [y(1), y(2), \ldots, y(N)]^T, \text{ and}$$

N is the number of data points.

Further, the parameter estimation error may be defined as:

$$\tilde{\theta} \stackrel{\Delta}{=} \hat{\theta} - \theta = [\Phi^T \Phi]^{-1} \Phi^T S \qquad \text{[Equation 8]}$$

where, S denotes non-modeled response vector which may be defined as:

$$S \stackrel{\Delta}{=} [\eta(1), \eta(2), \ldots, \eta(N)]^T \qquad \text{[Equation 9]}$$

Referring back to FIG. 3, the calculation module 330 calculates test variable and difference between numerator coefficients of the transfer function using covariance of the parameters of the normal reference model estimated at the parameter estimation module 320 and the parameter estimated error.

The estimated parameters obtained from the nonfaulty data set by the reference model database construction device 200 and the estimated parameters obtained at the parameter estimation module 320 may be expressed by:

$$\hat{\theta} = \begin{cases} \hat{\theta}_n, & \text{for data set } I_n (\text{nonfaulty data}) \\ \hat{\theta}_f, & \text{for data set } I_f (\text{suspected faulty data}) \end{cases} \qquad \text{[Equation 10]}$$

where $I_n$ denotes nonfaulty data set, $I_f$ is suspected faulty data set, $\hat{\theta}_n$ are estimated parameters of nonfaulty data set ($I_n$), and $\hat{\theta}_f$ are estimated parameters of the suspected faulty data set ($I_f$).

Estimated transfer function may be obtained using the above-mentioned parameters by:

$$G(z^{-1}, \hat{\theta}) = \begin{cases} \hat{G}_n(z^{-1}) = G(z^{-1}, \hat{\theta}_n) & \text{for } I_n \\ \hat{G}_f(z^{-1}) = G(z^{-1}, \hat{\theta}_f) & \text{for } I_f \end{cases} \qquad \text{[Equation 11]}$$

The estimated transfer function, obtained as a result of Equation 11, reveals the fact that the estimated parameters of the nonfaulty data and the estimated parameters of the suspected faulty data are different from each other.

The fault detection procedure now amounts to comparing $\hat{\theta}_n$ and $\hat{\theta}_f$, deciding whether the observed changes can be explained satisfactorily in terms of the effects of noise, undermodeling, and nonlinearity.

In other words, it is necessary to determine whether or not the observed changes are within a normal range.

The present invention proposes methods for enabling the above-mentioned determination.

According to the present invention, effects of noise, undermodeling and nonlinearity are reflected via covariance C of the parameter estimated error in the form of uncertainty upper bound.

This is calculated at the covariance calculation module 320 of the reference model database construction device 200, and using Equation 12 under condition that allows identification of the suspected faulty data to be the nonfaulty data in advance.

$$C \stackrel{\Delta}{=} Cov(\hat{\theta}_n - \hat{\theta}_f) = E\{[\hat{\theta}_n - \hat{\theta}_f][\hat{\theta}_n - \hat{\theta}_f]^T\} \qquad \text{[Equation 12]}$$

where C denotes covariance of the parameter estimated error.

The covariance C is obtained once at the reference model database construction device 200 under assumption that all the data are nonfaulty data. Accordingly, unlike the above explanation where $\hat{\theta}_f$ are estimated parameter vectors of the suspected faulty data set, both $\hat{\theta}_n$ and $\hat{\theta}_f$ correspond to estimated parameter vectors of two different nonfaulty data sets.

Accordingly, the covariance C has an important meaning as an uncertainty upper bound under nonfaulty condition.

Equation 12 is inherently based on the hypothesis that the means of $\hat{\theta}_n$ and $\hat{\theta}_f$ are zero (0), respectively.

Equation 12 may be rearranged as:

$$C = [Q_n - Q_f] R [Q_n - Q_f]^T + [Q_{nn} - Q_{nf}] R_n [Q_{nn} - Q_{nf}]^T + [P_n + P_f] \sigma_v^2 \qquad \text{[Equation 13]}$$

where $\sigma_v^2$ denotes variance of measurement noise. The variance of the measurement noise may be obtained in advance by the measurement at the vibration sensor, and be defined as:

$$Q_i \stackrel{\Delta}{=} P_i \Phi_i^T \psi_i, Q_{ni} \stackrel{\Delta}{=} P_i \Phi_i^T \psi_{ni}, P_i \stackrel{\Delta}{=} [\Phi_i^T \Phi_i]^{-1}, i=n,f,$$

and $$R \stackrel{\Delta}{=} E[HH^T], R_n \stackrel{\Delta}{=} E[H_n H_n^T],$$

where, $$\Phi_i = \begin{bmatrix} \phi^T(1) \\ \vdots \\ \phi^T(N) \end{bmatrix} = \begin{bmatrix} u_F(0) & u_F(-1) & \ldots & u_F(1-N_B) \\ u_F(1) & u_F(0) & \ldots & u_F(2-N_B) \\ \vdots & \vdots & \ddots & \vdots \\ u_F(N-1) & u_F(N-2) & \ldots & u_F(N-N_B) \end{bmatrix},$$

$$\psi_i \stackrel{\Delta}{=} \begin{bmatrix} u(1) & 0 & \ldots & 0 \\ u(2) & u(1) & \ddots & \vdots \\ \vdots & \vdots & \ddots & 0 \\ u(N) & u(N-1) & \ldots & u(1) \end{bmatrix},$$

$$\psi_{ni} \stackrel{\Delta}{=} \begin{bmatrix} u^2(1)\text{sign}(u(1)) & 0 & \ldots & 0 \\ u(2)\text{sign}(u(2)) & u(1)^2\text{sign}(u(1)) & \ddots & \vdots \\ \vdots & \vdots & \ddots & 0 \\ u^2(N)\text{sign}(u(N)) & u^2(N-1)\text{sign}(u(N-1)) & \ldots & u^2(1)\text{sign}(u(1)) \end{bmatrix}$$

And $$H \stackrel{\Delta}{=} [h(0) \; h(1) \; \ldots \; h(N-1)]^T, H_n \stackrel{\Delta}{=} [h_n(0) \; h_n(1) \; \ldots \; h_n(N-1)]^T.$$

If there is no undermodeling and no nonlinearity, that is, if the output of the airplane engine model is expressed only by model, input data and measurement noise, or if the inputs are identical (i.e., $\Phi_n = \Phi_f$), the two terms on the right-hand side of Equation 13 vanish, and the equation is compactly rearranged as:

$$C = [P_n + P_f] \sigma_v^2.$$

Because the transfer functions of the reference nonfaulty model and suspicious model have the same denominator, if $\Phi_n = \Phi_f$, this means that the input data are identical.

Accordingly, the present invention proposes simplifying mathematical formulae by using the same input data to obtain the nonfaulty model and the suspicious faulty model.

Herein, H and $H_n$ denote impulse response vectors of the mismatched model and the linearization error model, respectively, and R and $R_n$ are obtained by:

$$E[h(k)h(j)]=r(k)\delta_{kj}$$

$$E[h_n(k)h_n(j)]=r_n(k)\delta_{kj} \quad \text{[Equation 14]}$$

where, $\delta$ denotes Kronecker delta, and $r(k)$ and $r_n(k)$ may be obtained by:

$$r(k)=\sigma_0^2 e^{-\beta k}, r_n(k)=\sigma_n^2 e^{-\beta_n k};\ k=0,1,\ldots$$

Herein, $\sigma_0^2$, $\sigma_n^2$, $\beta$, $\beta_n$ may be obtained by advance experiment on nonfaulty engine system, in which $2/\beta, 2/\beta_n$ may generally be considered to be average time constant of the mismatched model and linearized error model, respectively.

The calculation module 330 obtains test variables using covariance of the parameter estimated error based on the nonfaulty data at the reference model database construction device 200, and the parameters of the reference nonfaulty model and the suspected faulty model obtained at the parameter estimation module 320 using the suspected faulty data.

That is, the calculating module may obtain the test variables using:

$$T_1=[\hat{\theta}_n-\hat{\theta}_f]^T C^{-1}[\hat{\theta}_n-\hat{\theta}_f] \quad \text{[Equation 15]}$$

where $T_1$ denotes test variables which are used as a reference to determine presence/absence of fault.

Further, the calculation module 330 obtains a difference between the numerator coefficient of the reference nonfaulty model and the numerator coefficient of the suspicious mode obtained at the reference model DB establishment device.

At this time, the denominator of the suspicious model is fixed as the denominator of the reference nonfaulty model.

The difference is used as a reference to diagnose a cause of the fault.

The fault detection and diagnosis module 340 determines presence/absence of a fault in the airplane engine, using the test variable obtained at the calculation module 330, and diagnoses the cause of fault according to the respective faults of the engine, using the difference of the numerator coefficients obtained at the calculation module 330.

Accordingly, the fault detection and diagnosis module 340 determines that the airplane engine has a fault, if the test variable exceeds a predetermined threshold.

Next, the fault detection and diagnosis module 340 determines a cause of the fault corresponding to the difference of the numerator coefficients, using the cause of fault by referring to the pre-stored numerator coefficient differences.

That is, because the fault detection and diagnosis module 340 stores therein causes of faults matched with the respective numerator coefficient differences, the fault detection and diagnosis module 340 thus extracts the cause of fault corresponding to the obtained numerator coefficient difference.

The method for diagnosing cause of fault at the fault detection and diagnosis module 340 will be explained below with reference to FIGS. 12A and 12B.

The fault detection and diagnosis method 300 may additionally include a diagnosis result notification module 350 to notify a user of the result of the diagnosis made at the fault detection and diagnosis module 340.

The diagnosis result notification module 350 may notify whether the fault is occurred or not and the diagnosis result, using a previously-registered wireless communication terminal, wired communication terminal, etc.

Figure 6:
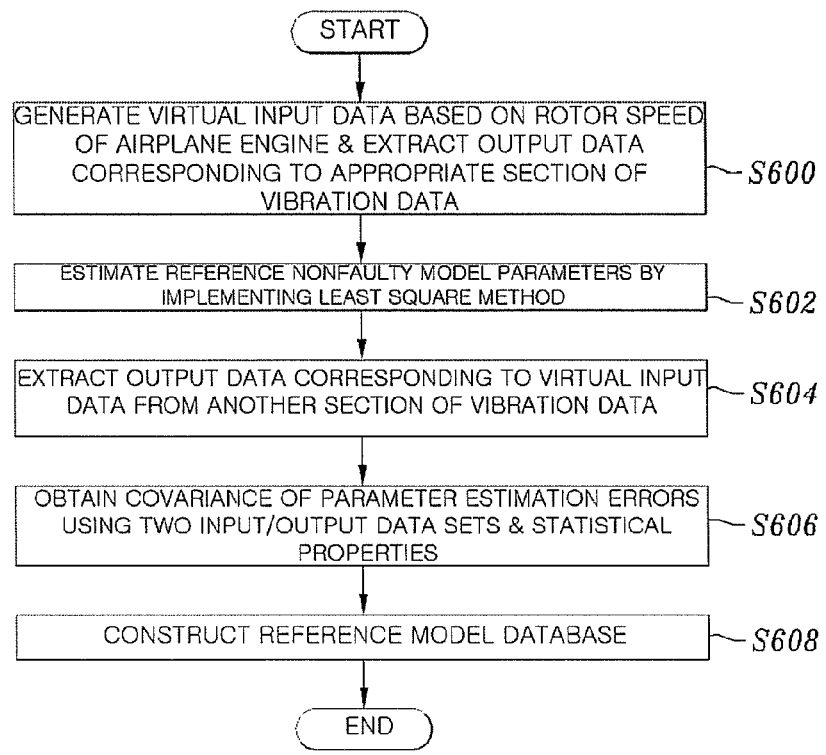
FIG. 6 is a flowchart provided to explain a method for construction a reference model database according to the present invention.

FIG. 6 is a flowchart provided to explain a method for constructing a reference model database according to the present invention.

Referring to FIG. 6, at S600, the reference model database constructing device generates virtual input data using rotor speed of an airplane engine, and the vibration data from one or more vibration sensors attached to the airplane and extracts output data.

The method of generating the virtual input data and extracting output data at the reference model database construction device will be explained in greater detail below with reference to FIG. 7.

At S602, following the operation at S600, the reference model database constructing device applies the least squares method with respect to the input/output data sets suitable for identifying airplane engine to thus estimate reference model parameters.

That is, the reference model database constructing device estimates parameters F and B of the models illustrated in FIGS. 4 and 5.

Next, at S604, the reference model database constructing device extract output data that corresponds to the virtual input data of another section of the vibration data used at S602, and at S606, obtains a covariance of the parameter estimation errors using the two input/output data sets and statistical properties.

Next, at S608, the reference model database constructing device constructs a reference model database based on the estimated reference nonfaulty parameters and the covariance of the parameter estimation errors.

Figure 7:
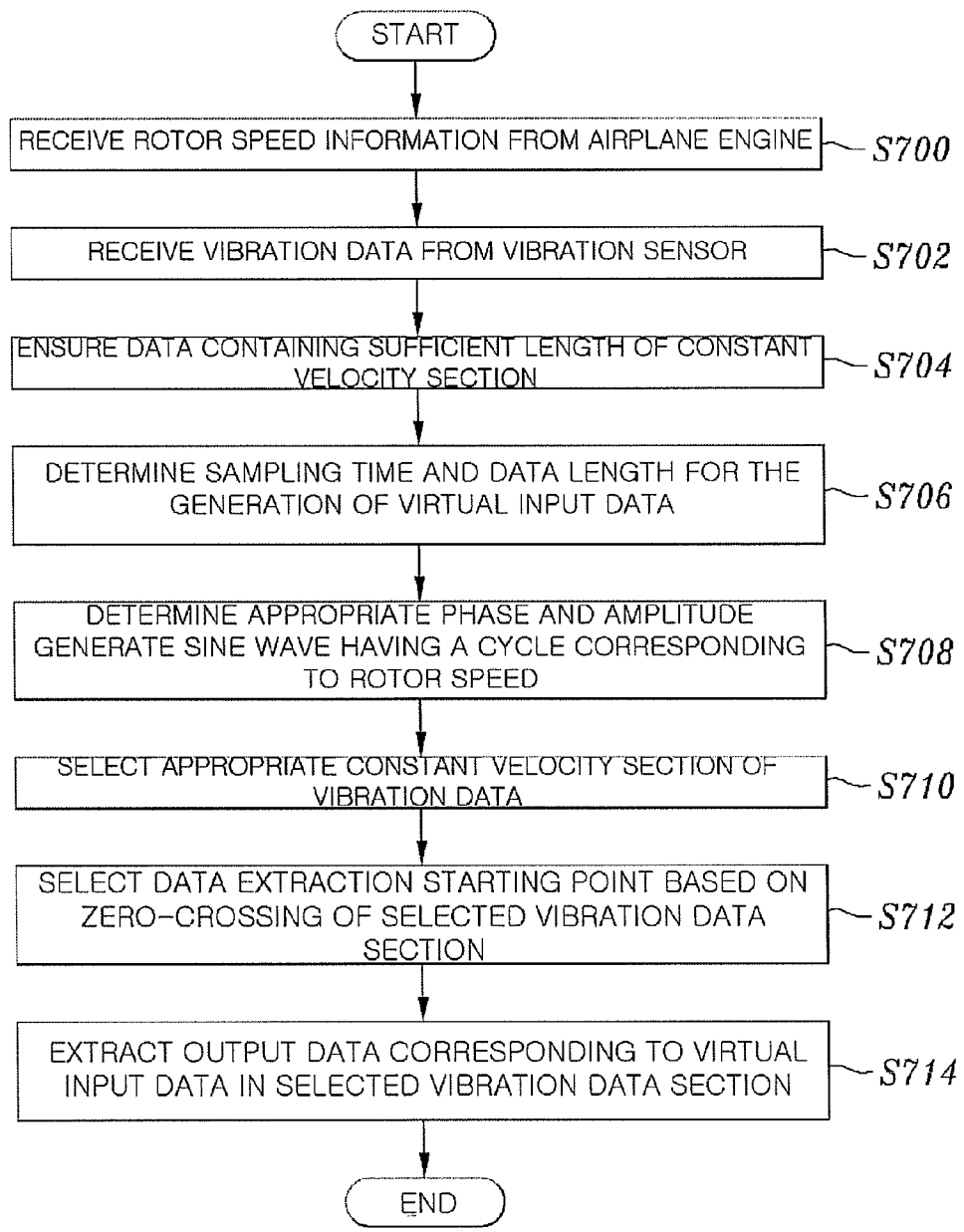
FIG. 7 is a flowchart provided to explain a method for generating virtual input data and extracting output data according to the present invention.
Figure 8:
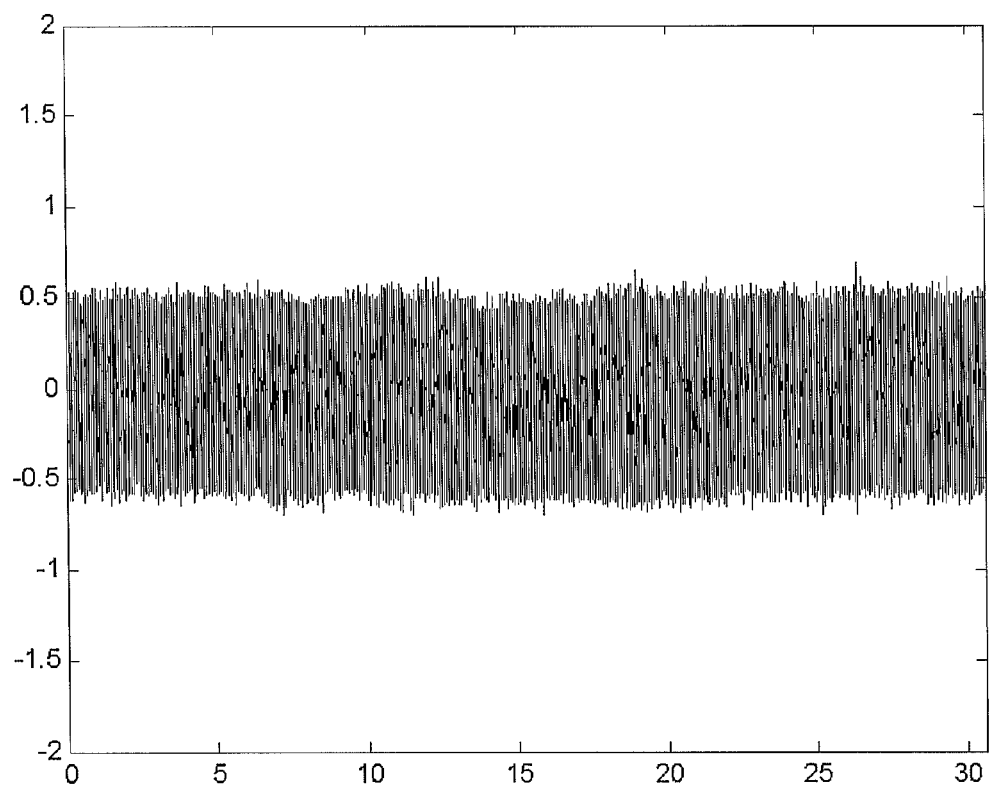
FIG. 8 illustrates an example of vibration data obtained when rotors of an airplane engine have uniform velocity according to the present invention.
Figure 9:
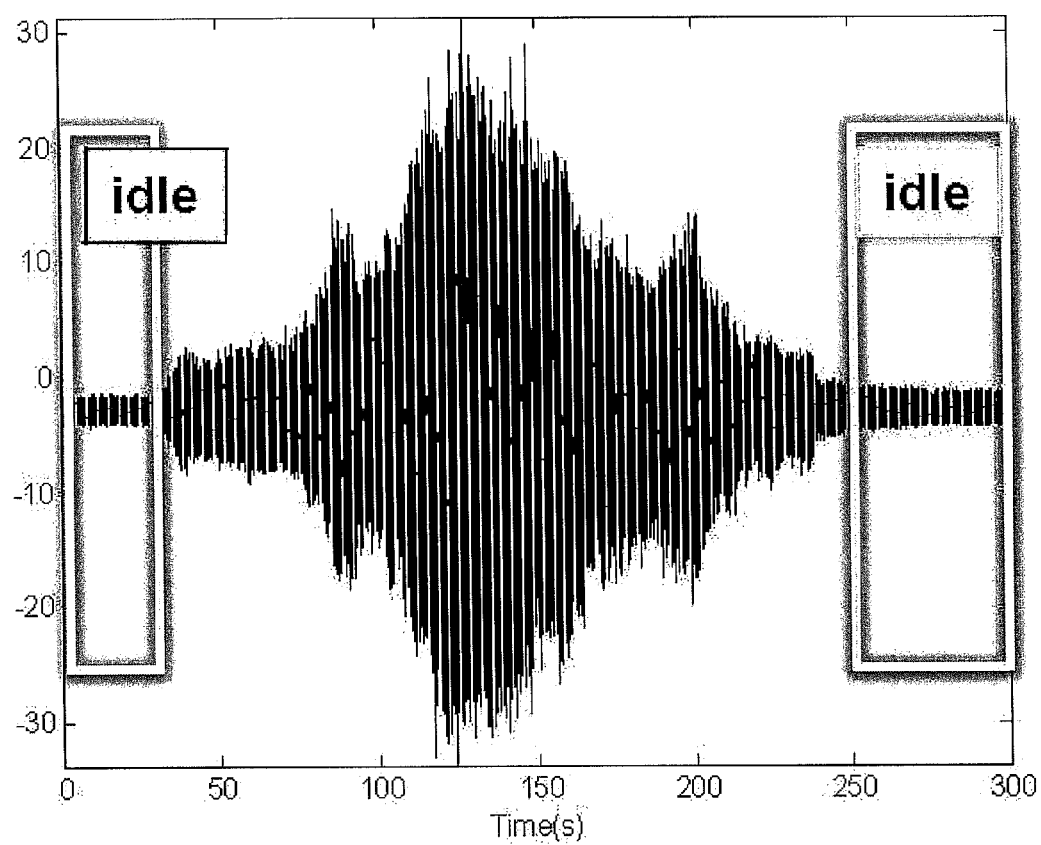
FIG. 9 illustrates an example of engine vibration data according to the present invention.
Figure 10A:
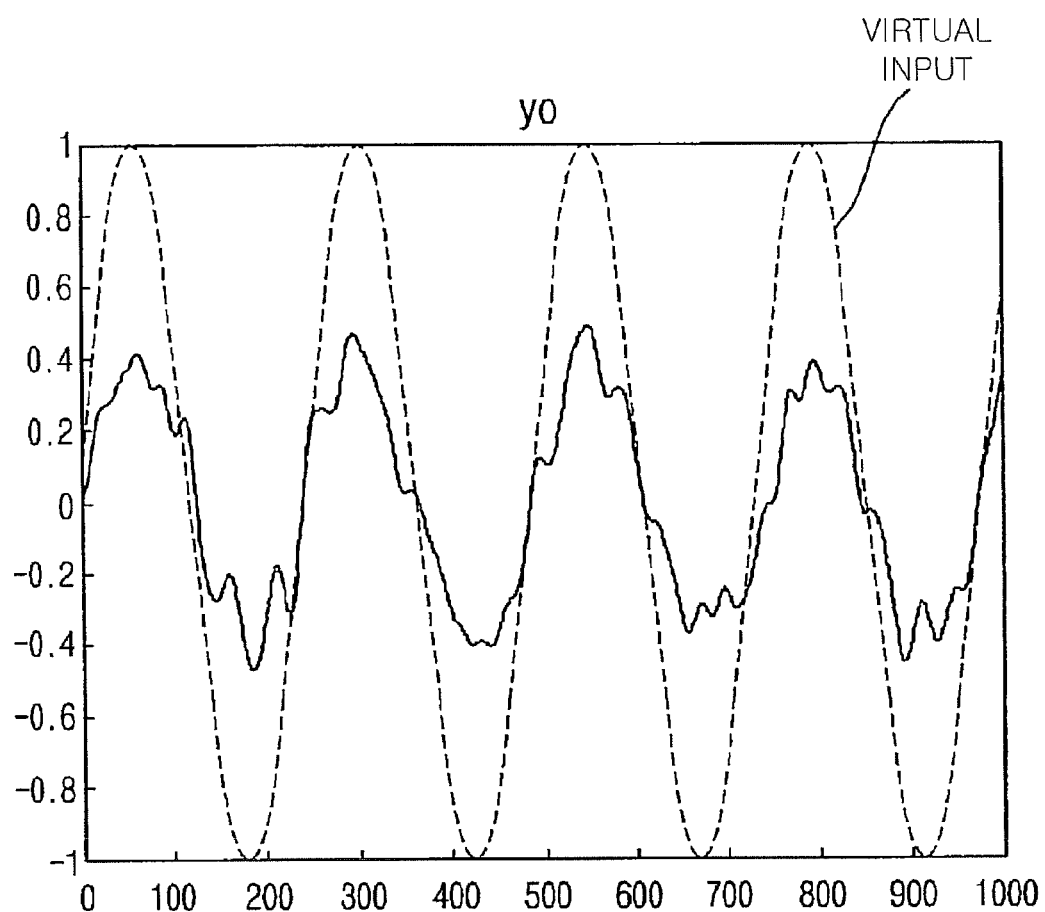
FIG. 10A illustrates virtual input data overlapped with vibration data.

FIG. 7 is a flowchart provided to explain a method for generating virtual input data and extracting output data according to the present invention, FIG. 8 illustrates an example of vibration data obtained when rotors of an airplane engine have uniform velocity according to the present invention, FIG. 9 illustrates an example of engine vibration data according to the present invention, and FIG. 10A illustrates virtual input data overlapped with vibration data.

Figure 10B:
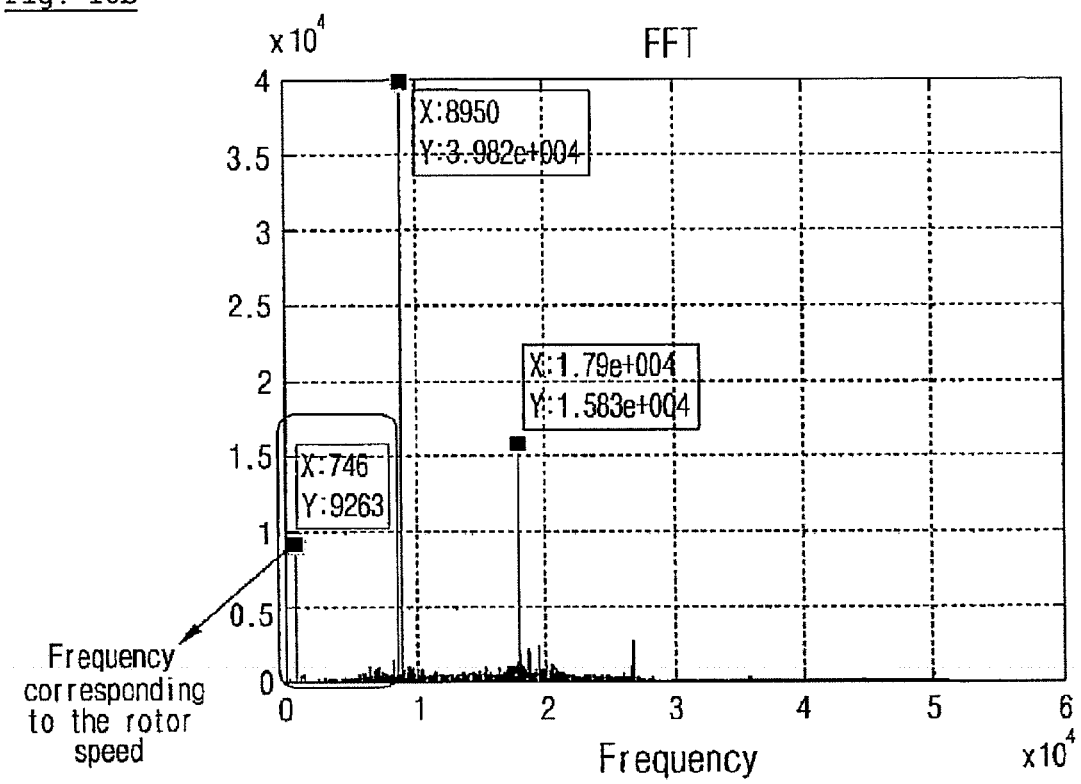
FIG. 10B is a graph of fast Fourier transform (FFT) analyzing the engine vibration data of FIG. 9.

FIG. 10B is a graph of fast Fourier transform (FFT) analyzing the engine vibration data of FIG. 9.

Referring to FIG. 7, at S700, the reference model database constructing device receives rotor speed of the airplane engine from the electronic system of the airplane while the airplane engine is idly running ('in idle state') or in cruise state, and at S702, receives vibration data from the vibration sensors installed on the airplane.

The received vibration data is nonfaulty data which is free of fault.

The 'vibration data received at the reference model database constructing device' refers to the data obtained when the airplane engine is in idle or cruise state as illustrated in FIG. 8. That is, the vibration data refers to the data obtained when the rotor speed is at constant rate.

If the vibration data is not within the constant velocity section, changes in vibration data fluctuate as illustrated in FIG. 9, hindering generation of input data.

Accordingly, the reference model database constructing device uses the vibration data from the constant velocity section.

After the operation at S702, at S704, the data containing a sufficient length of constant velocity section is ensured, at S706, the sampling time and length of data for generating virtual input data are determined, at S708, appropriate phase and amplitude are determined and a sine wave having cycle corresponding to the rotor speed is generated, at S710, appropriate constant velocity section for vibration data different from the vibration data section selected at S708 is selected, at S712, starting time of data extraction is selected via zero-crossing detection at the selected vibration data section, and at S714, output data corresponding to the virtual input data having the appropriate phase within the vibration data section selected is selected according to the selected starting point of extraction.

Under condition that vibration data as that illustrated in FIG. 8

FIG. 10A illustrates the virtual input data generated as the reference model database constructing device receives from the electronic system of the rotor speed of the airplane engine and vibration data illustrated in FIG. 8, in which the received rotor speed is a cycle of a sine wave, amplitude is set to 1, and the zero-crossing point of the vibration data is set as a starting point of the virtual input data, i.e., the phase of the sine wave is set to 0. FIG. 10B illustrates the engine vibration data of FIG. 9 after fast Fourier transform (FFT) analysis.

Referring to the drawing, the section corresponding to frequency 0-1 matches the rotor speed of the airplane engine.

Figure 11:
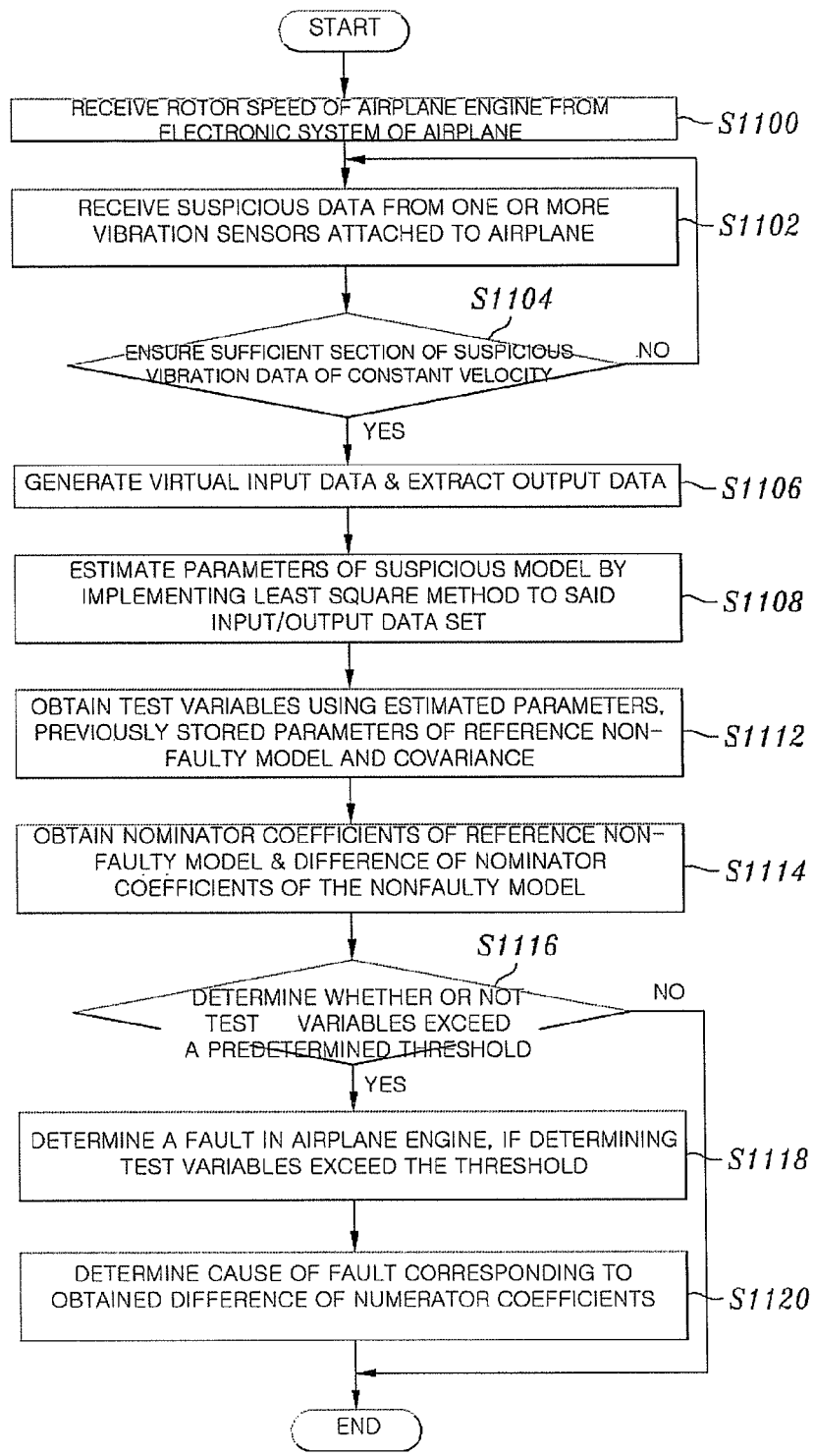
FIG. 11 is a flowchart provided to explain a method for detecting and diagnosing a fault of an airplane engine according to the present invention.

FIG. 11 is a flowchart provided to explain a method for detecting and diagnosing a fault of an airplane engine according to the present invention.

Referring to FIG. 11, at S1100, the fault detection and diagnosis method receives rotor speed of the airplane engine from the electronic system of the airplane, at S1102, receives suspicious data from one or more vibration sensors attached to the airplane, at S1104, ensures sufficient amount of suspicious vibration data at constant speed, at S1106, generates virtual input data and extracts output data, and at S1108, estimates suspicious model parameters by implementing least squares method to the input/output data set.

Herein, the denominator of the suspicious model is identical to the denominator of the reference nonfaulty model.

Following S1110, at S1112, the fault detection and diagnosis method obtains test variables using the estimated parameters, the previously stored reference normal model parameters, and covariance of the estimation error parameters, and at S1114, obtains the denominator coefficients of the reference nonfaulty model and differences of the numerator coefficients of the reference model.

At S1118, if the result of the determination exceeds a predetermined threshold, the fault detection and diagnosis method determines that a fault is generated in the airplane engine, and at S1120, determines a cause of the fault that corresponds to the obtained difference of the numerator coefficients.

That is, because the fault detection and diagnosis method has map information of the causes of faults matched with the differences of the numerator coefficients, the fault detection and diagnosis method can diagnose the cause of the fault using the differences of the numerator coefficients.

After S1120, the fault detection and diagnosis method may inform the result of fault diagnosis via a previously registered user terminal, or the like.

Figure 12A:
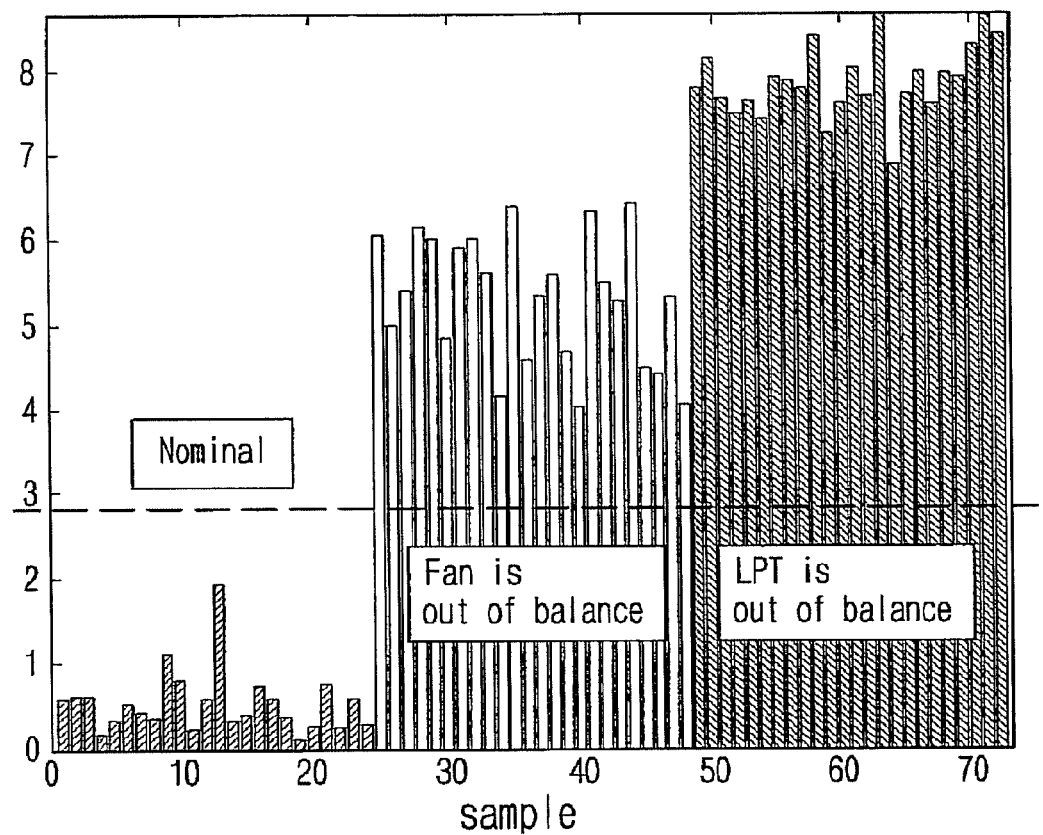
FIGS. 12A and 12B illustrate examples to explain detecting and diagnosing a fault of an airplane engine according to the present invention.
Figure 12B:
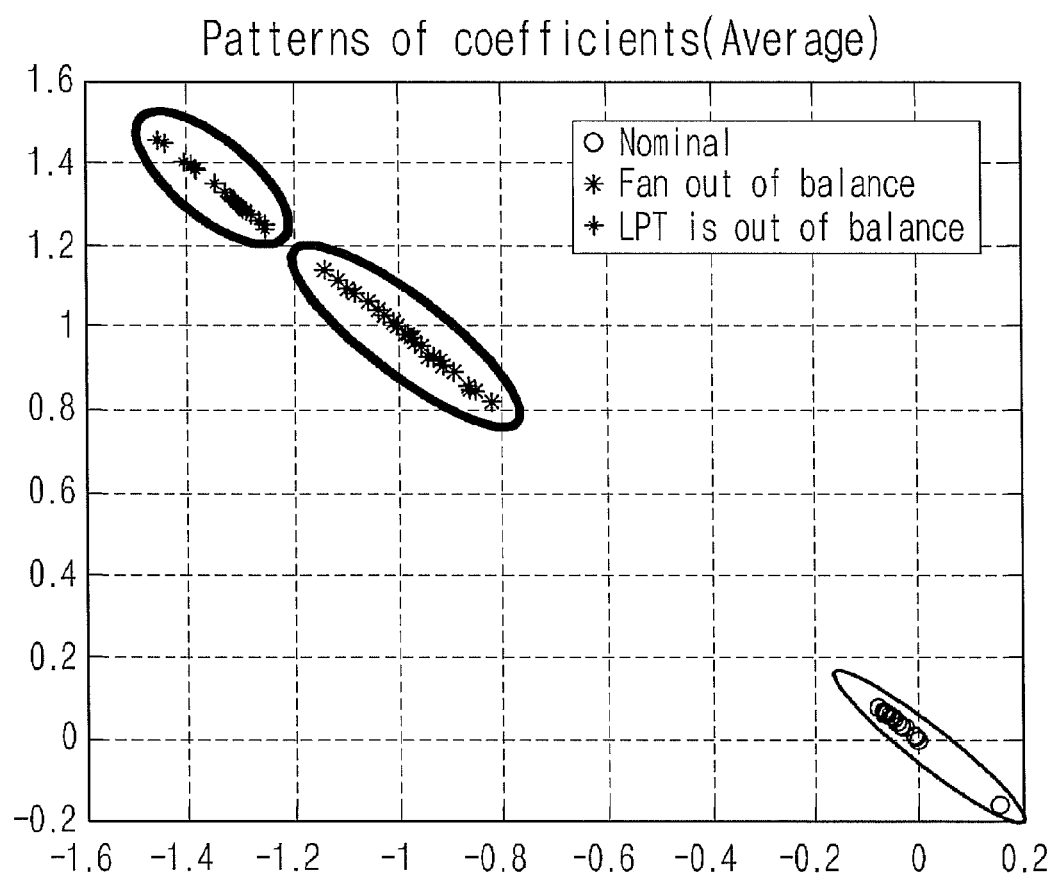

FIGS. 12A and 12B illustrate examples to explain detecting and diagnosing a fault of an airplane engine according to the present invention.

Referring to FIG. 12A, if the test variables are less than a predetermined threshold, it is determined that the airplane engine does not have a fault, while if the test variables exceed the predetermined threshold, fault of the airplane engine is determined.

That is, referring to FIG. 12A, the first section on the left-most side indicates nonfaulty status in which the test variables do not exceed the threshold (3), whereas the second and third sections indicate faulty status in which the test variables exceed the threshold.

FIG. 12 illustrates the pattern of the differences of the numerator coefficients, according to which the causes of fault is determined.

That is, because the fault detection and diagnosis method stores therein causes of faults matched with the respective differences of numerator coefficients, the fault detection and diagnosis method can identify the place where the fault is occurred by referring to the pattern of the differences of numerator coefficients.

INDUSTRIAL APPLICABILITY

As explained above, in various embodiments, it is possible to determine presence/absence of fault of an engine and cause of the fault, using vibration data of the airplane engine.

Further, in various embodiments, it is possible to provide improved accuracy of fault detection and diagnosis in an airplane, and real-time detection and diagnosis of fault of the airplane, thereby enabling early detection and prognosis of the fault.

The foregoing embodiments and advantages are merely exemplary and are not to be construed as limiting the present invention. The present teaching can be readily applied to other types of devices. Also, the description of the exemplary embodiments of the present inventive concept is intended to be illustrative, and not to limit the scope of the claims, and many alternatives, modifications, and variations will be apparent to those skilled in the art.

What is claimed is:

1. A system for detection and diagnosis of fault of an airplane engine, the system comprising:
one or more vibration sensors attached to the airplane;
a reference model database construction device which generates virtual input data using nonfaulty vibration data from the vibration sensors and rotor speed of the airplane engine and extracts output data, estimates nonfaulty model parameters based on the input/output data set, obtains a covariance using another input/output data set different from the input/output data set, and constructs a reference model database, wherein the reference model database construction device comprises:
a generation and extraction module which generates virtual input data using nonfaulty vibration data from one or more vibration sensors attached to an airplane and rotor speed of an airplane engine and extracts output data;
a reference model parameter estimation module which estimates reference model parameters by applying least squares method to the input/output data set; and
a covariance calculation module which obtains a covariance of parameter estimation errors using the input/output data set, another input/output data set selected from different section of nonfaulty vibration data, statistical property corresponding to variance of sensor noise from the vibration sensors, and statistical property of unmodeled transfer functions; and
a fault detection and diagnosis method which estimates suspicious model parameters using suspicious data from the vibration sensors, obtains test variables and a difference of numerator coefficients of transfer functions using the estimated parameters, the reference nonfaulty model parameters and the covariance of the parameter estimation errors, and determines presence/absence of fault of the airplane engine and the cause of the fault based on the test variables and the difference of the numerator coefficients wherein the fault detection and diagnosis method comprises:

a generation and extraction module which generates virtual input data using suspicious vibration data received from one or more vibration sensors attached to an airplane and rotor speed of an engine of the airplane and extracts output data;

a parameter estimation module which estimates suspicious model parameters by applying least squares method to a predetermined section using the input/output data set;

a calculation module which obtains test variables and a difference of numerator coefficients by using the input/output data set, previously stored reference nonfaulty model parameters, and a covariance of parameter estimation errors; and a fault detection and diagnosis module which detects a presence/absence of a fault of the airplane engine based on the obtained test variables and the difference of numerator coefficients, and diagnoses a cause of the fault.

2. The system for detection and diagnosis of fault of an airplane engine as set forth in claim 1, further comprising a storage module which stores the reference nonfaulty model parameters and the covariance of the parameter estimation errors.

3. The system for detection and diagnosis of fault of an airplane engine as set forth in claim 1, wherein the generation and extraction module receives the rotor speed of the airplane engine and the vibration data from the one or more vibration sensors attached to the airplane until when a sufficient constant velocity section is ensured, to thereby determine sampling time suitable for identifying the system of the airplane engine and overall data size, generates virtual input data with a cycle corresponding to the rotor speed of the engine, and appropriate amplitude and phase, selects a starting point of data extraction based on zero-crossing detection by selecting an appropriate constant velocity section of the vibration data, and extracts output data corresponding to the virtual input data.

4. The system for detection and diagnosis of fault of an airplane engine as set forth in claim 1, wherein the calculation module obtains the test variables using the reference model parameters, the covariance of the parameter estimation errors, and the estimated suspicious model parameters.

5. The system for detection and diagnosis of fault of an airplane engine as set forth in claim 4, wherein the calculation module obtains a difference of numerator coefficients between transfer function of the reference nonfaulty model and transfer function of the suspicious model.

6. The system for detection and diagnosis of fault of an airplane engine as set forth in claim 5, wherein denominator of the suspicious model transfer function is fixed as denominator of the reference nonfaulty model transfer function.

7. The system for detection and diagnosis of fault of an airplane engine as set forth in claim 1, wherein the fault detection and diagnosis module determines that a fault is generated in the airplane engine, if the test variables are equal to or greater than a predetermined threshold.

8. The system for detection and diagnosis of fault of an airplane engine as set forth in claim 1, wherein the fault detection and diagnosis module diagnoses a cause of fault corresponding to the obtained difference of numerator coefficients, using causes of faults matched with differences of numerator coefficients stored in advance.

9. A method for constructing a reference model database, the method comprising steps of:

(a) generating virtual input data using nonfaulty vibration data from one or more vibration sensors attached to an airplane and rotor speed of an airplane engine and extracting output data;

(b) estimating reference model parameters by applying least squares method to the input/output data set;

(c) obtaining a covariance of parameter estimation errors using the input/output data set, another input/output data set selected from different section of nonfaulty vibration data, statistical property corresponding to variance of sensor noise from the vibration sensors, and statistical property of unmodeled transfer functions; and (d) and constructing the reference model database by storing the estimated reference model parameters and the covariance of the parameter estimation errors wherein the step (a) comprises steps of:

receiving nonfaulty vibration data of the airplane engine from the one or more vibration sensors and determining vibration data corresponding to when the rotor speed is in constant velocity section and the rotor speed at that time;

generating virtual input data in a sine wave pattern having appropriate sampling time and data size, using a cycle corresponding to a cycle of the determined rotor speed and appropriate phase and amplitude;

selecting, from the received vibration data, a reference starting point of data extraction based on zero-crossing by selecting appropriate constant velocity section of the vibration data for use in the parameter estimation; and extracting, from the selected reference point, output data corresponding to the generated virtual input since the selected reference starting point of the vibration data.

10. A method for detection and diagnosis of fault of an airplane engine, the method comprising steps of:

(a) receiving suspicious vibration data of the airplane engine from the one or more vibration sensors and determining vibration data corresponding to when the rotor speed is in constant velocity section and the rotor speed at that time;

(b) estimating suspicious model parameters by implementing least square methods to the obtained input/output data set;

(c) obtaining test variables and a difference of numerator coefficients of transfer functions, using the estimated parameters, previously stored reference nonfaulty model parameters and a covariance of parameter estimation errors; and (d) detecting a presence/absence of a fault in the airplane engine based on the obtained test variables and the difference of the numerator coefficients and diagnosing a cause of the fault wherein the step (a) comprises: receiving information from an electronic system of the airplane to determining rotor speed, and determining time interval corresponding to one cycle of the sine wave via zero-cross detection of the vibration data.

11. The method as set forth in claim 10, wherein, prior to the step (a), further comprising steps of, if the rotor speed of the airplane engine is in constant velocity section, generating virtual input data using nonfaulty vibration data from the vibration sensors and the rotor speed of the airplane engine, obtaining reference nonfaulty model parameters based on the input/output data set, and constructing a reference model database by obtaining a covariance of the parameter estimation errors which reflects a degree of uncertainty using the input/output data set, another input/output data set selected from another nonfaulty section of the vibration data, and statistical property.

12. The method as set forth in claim 10, wherein, after the step (d), further comprising a step of notifying a user of a result of diagnosing presence/absence of fault.

13. The method as set forth in claim 10, wherein the step (c) comprises obtaining test variables using parameters of the reference model database, the covariance, and parameters estimated from the suspicious data, and obtains a difference of numerator coefficients between transfer function of the reference model database model and transfer function of the model estimated from the suspicious data.

14. The method as set forth in claim 10, wherein the step (d) comprises:
- determining that a fault is generated in the airplane engine, if the test variables as obtained are equal to or greater than a predetermined threshold; and
- diagnosing a cause of the fault that corresponds to the difference of the numerator coefficients, using previously stored causes of faults matched with the respective differences of the numerator coefficients.

\* \* \* \* \*